Feb. 9, 1954  R. A. HAMILTON  2,668,588
MAGNETICALLY OPERATED PRESELECTOR
Filed Oct. 5, 1948  6 Sheets-Sheet 1

Fig. 1.

INVENTOR.
RALPH A. HAMILTON,
BY
Paul A. Weilein
ATTORNEY.

Feb. 9, 1954

R. A. HAMILTON 2,668,588

MAGNETICALLY OPERATED PRESELECTOR

Filed Oct. 5, 1948

INVENTOR.
RALPH A. HAMILTON,
BY
Paul A. Weilein
ATTORNEY.

Feb. 9, 1954 R. A. HAMILTON 2,668,588
MAGNETICALLY OPERATED PRESELECTOR
Filed Oct. 5, 1948 6 Sheets-Sheet 4

INVENTOR.
RALPH A. HAMILTON,
BY
Paul A. Weilein
ATTORNEY.

Feb. 9, 1954 — R. A. HAMILTON — 2,668,588
MAGNETICALLY OPERATED PRESELECTOR
Filed Oct. 5, 1948 — 6 Sheets-Sheet 5

INVENTOR.
RALPH A. HAMILTON,
BY
Paul A. Weilein
ATTORNEY.

Feb. 9, 1954 R. A. HAMILTON 2,668,588
MAGNETICALLY OPERATED PRESELECTOR
Filed Oct. 5, 1948 6 Sheets-Sheet 6

INVENTOR.
RALPH A. HAMILTON,
BY
Paul A. Weilein
ATTORNEY.

Patented Feb. 9, 1954

2,668,588

UNITED STATES PATENT OFFICE 2,668,588

MAGNETICALLY OPERATED PRESELECTOR

Ralph A. Hamilton, Glendale, Calif., assignor of one-half to Fred Richard Hamilton, Glendale, Calif.

Application October 5, 1948, Serial No. 52,918

43 Claims. (Cl. 161—1)

This invention relates to a preselector mechanism wherein an activating zone is optionally created on a movable medium for effecting a subsequent operation of a desired operator; more particularly, it relates to such mechanism wherein a magnetic zone is optionally impressed on a magneto-retentive medium for causing operation of a magneto-responsive operator at a predetermined future time.

It is an object of this invention to provide improved mechanism of this character.

It is another object of this invention to provide a preselector mechanism wherein any one of a predetermined group of operations may be selected optionally to occur at any time in the future within the range of operation of the mechanism.

It is another object of this invention to provide such mechanism insuring accurate timing of the occurrence of the selected operations.

It is another object of this invention to provide such mechanism adapted to accommodate future selections over an extended period of time.

It is another object of this invention to provide a preselector mechanism in which the selected operations will be caused automatically to recur at definite time intervals.

It is another object of this invention to provide a preselector mechanism in which a previously made selection can be changed at any time to another one of the predetermined group, or merely erased, without affecting any of the other selections already made.

It is another object of this invention to provide a preselector mechanism, wherein any member of the predetermined group of operations, one or more or all optionally may be selected to occur simultaneously at any desired time.

It is another object of this invention to provide a preselector mechanism utilizing a movable, magnetically retentive control medium in which magnetic zones may be impressed which after a predetermined movement of the medium, actuate magnetically responsive operators.

It is another object of this invention to provide such mechanism including driving means for advancing the control medium, wherein the medium may be moved independently of the driving means to permit impression of the magnetic zones thereon to cause actuation of the operators at a desired time.

It is still another object of this invention to provide a preselector mechanism adapted to control, for example, the operation of machines of various types, call bell systems, radio receivers, etc.

It is still another object of this invention to provide improved apparatus for use with a radio receiver to enable preselection of the programs to be received.

It is another object of this invention to provide a novel form of control medium for a preselector.

It is still another object of this invention to provide such mechanism wherein the control medium is in the form of a continuous member, optionally causing, automatically, repetition of the chosen operations at definite time intervals.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

The mechanism of the invention comprises a magnetically permeable element such as a wire or tape which may be continuous or not, and which is capable of having a magnetic zone or zones impressed thereon and of retaining such zones for a substantial length of time. This element forms the control medium 6, which is arranged for movement in accordance with the requirements of the function or functions to be controlled. Thus, for example, such movement may be in accordance with the passage of time. This medium is in effect divided into sections of substantially equal length, the movement of the medium causing said sections to be successively brought into operative relation with a plurality of magneto-responsive operators O. Means M are provided for optionally creating magnetized zones on said medium in predetermined spaced relation with the operators O. Thus, after appropriate movement of the medium 6, which may correspond with a definite time interval, the magnetized zone will be in operative relation with one of the operators. Means are provided to cause such operator to respond to the magnetized zone so as to be operated thereby and perform a control function.

To enable the preselection to be made for a desired time, clock controlled means are provided for advancing the control medium 6, the control medium being arranged to be disconnected therefrom for independent movement to bring a section into operative relation with the magnetizers M to permit creation of a magnetic zone thereon, which section will reach the operators O at the desired time. Means are provided for indicating the time at which the operators O will be reached by any given section and the actuation of the chosen operator occur. Means also are provided for selectively removing the magnetized zones on the medium when desired, to prevent operation of any of the operators at a particular time or to enable impression of a magnetic zone to actuate a different operator.

Referring to Figures 1 to 4, the control medium is indicated by the numeral 6 and is shown by way of example as a magnetizable wire of circular cross section. A rotatable driving member 7 is provided for advancing the medium 6, which is caused to engage the member 7 as by suitable supporting rollers 8 which also cooperate with the member 7 to position the medium 6 laterally. The medium 6 is maintained in positive or definitive driving relation with the driver 7 as by spaced notches or indentations 6-a which engage teeth or projections 7-a on the driver (see Figure 2).

Figure 1:
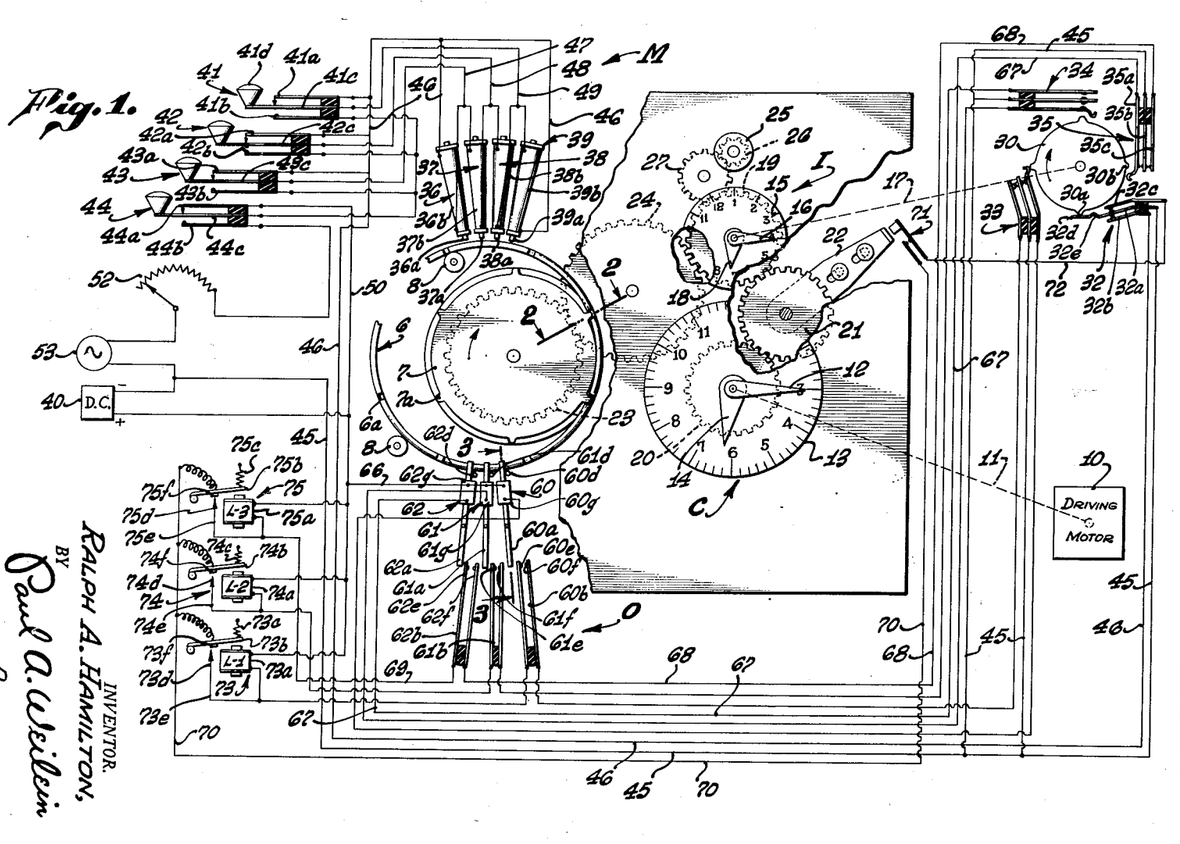
Figure 1 is a schematic view showing one form of preselector mechanism incorporating features of the invention.

The advance of the medium 6 may be continuous or not but in any event, is such as to define sections of substantially equal length thereon. To simplify the showing, these sections are illustrated as having a length equal to the spacing of the notches 6-a and are considered as extending between each pair of notches. As shown, the medium 6 is arranged to be advanced continuously a length of one section each fifteen minutes.

For this purpose, an appropriate motor 10 is provided, which may be for example a synchronous clock motor arranged to drive a shaft 11 carrying the minute hand 12 of a conventional clock C having the usual indicia 13. The hour hand 14 is driven at one twelfth the speed of the minute hand 12 by suitable gearing (not shown) from the shaft 11. An indicator I is provided adjacent the clock C and has similar indicia 15; however the indicia thereof is angularly offset with respect to that of face 13 as will be explained hereinafter. A hand 16 corresponding with the minute hand 12 and mounted on a shaft 17 is provided for cooperating with face 15. An hour hand 18 is also provided, being driven from the shaft 17 by appropriate reduction gearing (not shown).

The shaft 17 is arranged to be driven at the same speed and in the same direction as shaft 11 by means of gears 19 and 20 respectively on said shafts, and adapted to be coupled in driving relation, by a gear 21 rotatably supported on a slidably mounted arm 22 so that it can be moved optionally into and out of engagement with the gears 19 and 20. The driver 7 has a gear 23 in fixed driving relation therewith and connected with gear 19 by an idler gear 24. Thus, with the gear 21 in driving relation with gears 19 and 20, shaft 17 and driver 7 are driven by the motor 10. If gear 21 is moved out of driving relation with gears 19 and 20, shaft 17 and driver 7 are disconnected from the motor 10. A manually operable knob 25 is rotatably mounted at a desired point for operating the driver 7 and shaft 17 independently of the motor 10, being shown for this purpose, by way of example, as arranged to rotate a pinion 26 connected with gear 19 by an idler 27.

The shaft 17 has a cam member 30 fixed thereon having raised cam surfaces such as 30-a, 30-b, etc., thereon spaced substantially 90° apart for operating the switches 32, 33, 34 and 35, as will be more fully discussed hereinafter.

The magnetizing means M comprises a plurality of substantially identical magnetizing elements 36, 37, 38 and 39, each having a core extending normally from the medium 6 and providing pole faces 36-a, 37-a, 38-a and 39-a respectively adjacent the medium and substantially equally spaced therealong within the length of one of the previously mentioned sections on the medium. Each of the elements 36, 37, etc., has an energizing winding 36-b, 37-b, etc., thereon, arranged to be selectively connected with a D. C. source 40 by manually operable switches 41, 42 and 43.

The arrangement is such that operation of either one of the switches 41, 42 or 43 energizes the windings of a pair of adjacent elements 36 and 37, 37 and 38, or 38 and 39, and causes the pole faces thereof to become respectively south and north magnetic poles. Furthermore, the poles of any pair are always in the same relation. Thus, for example, in Figure 1 the right hand pole of any pair is always north. In this way a magnetic zone is created on the medium 6 having a length substantially equal to the spacing of the pole faces, and with the north pole leading as the medium is advanced.

The switches 41, 42, 43 and a switch 44, the purpose of which will be set forth presently, are substantially identical, hence only one will be described. Thus, for example, switch 41 comprises upper and lower stationary contacts 41–a and 41–b and a resilient blade 41–c normally closing against the upper contact 41–a and operable by the push button 41–d to open the upper contact 41–a and close against the lower contact 41–b. Corresponding parts of the other switches are indicated by the addition of corresponding letters to the numerals 42, 43 or 44 as the case may be. Cam operated switch 32 provides an over-riding control as will be pointed out hereinafter and unless closed prevents energization of the windings 36–b, 37–b, etc.

Switch 32, to be described more fully hereinafter, when closed, connects one lead 45, for example the negative, from the D. C. source 40, with lead 46 which is connected with the upper switch contacts 41–a, 42–a and 43–a, as well as with the opposite ends respectively of the endmost magnetic windings 36–b and 39–b. The other end of winding 36–b and the opposite end of the adjacent winding 37–b are connected to switch blade 43–c by lead 47; similarly, the other end of winding 37–b and the opposite end of winding 38–b are connected to switch blade 42–c by lead 48; and the other end of winding 38–b and the opposite end of winding 39–b are connected with switch blade 41–c by lead 49.

The other lead 50 (positive) from the source 40 is connected with the top contact 44–a of the switch 44, switch blade 44–c being connected with each of the lower contacts 41–b, 42–b and 43–b. Thus, with switches 41, 42 and 44 in their normal positions and switch 43 operated to close against the contact 43–b, current will flow from the source 40 via lead 50, contact 44–a, switch blade 44–c, contact 43–b, switch blade 43–c, lead 47 to one end of winding 36–b and the opposite end of winding 37–b, returning from winding 36–b via lead 46 and from winding 37–b via lead 48, switch blade 42–c, contact 42–a to lead 46, and thence via switch 32 and lead 45 to the source 40. Winding 36–b is spooled so that the associated pole face 36–a becomes a south magnetic pole with the current flow from lead 47 to lead 46. Winding 37–b is similarly spooled; hence with current flowing in the opposite direction therein (from lead 47 to lead 48) the pole face 37–a becomes north.

To reduce the number of magnetizers required to impress variously located magnetic zones in any given section of the medium 6, the circuit arrangement is such that the intermediate pole faces 37–a and 38–a may be either north or south magnetic poles. Thus, with magnetizers 36 and 37 being used to impress the magnetic zone, pole face 37–a must be north, but if magnetizers 37 and 38 are being used the pole face 37–a must be south. Similarly, pole face 38–a must be either north or south depending on whether the magnetizer 38 is being used with magnetizer 37 or 39. The windings 36–b, 37–b, 38–b and 39–b are all spooled in the same direction, the appropriate polarity of the associated pole faces being obtained by properly directing the current flow.

If magnetizers 37 and 38 are to be used, switches 41 and 43 are allowed to remain in their normal positions and switch 42 is operated to close against the lower contact 42–b. Current will then flow via lead 50, switch 44, contact 42–b, switch blade 42–c, lead 48 to windings 37–b and 38–b, thence from winding 37–b via lead 47 to switch blade 43–c and contact 43–a to the negative lead 46. Thus, the current flow in the winding 37–b is now in the opposite direction causing pole face 37–a to become south. Current from winding 38–b returns via lead 49, switch blade 41–c and contact 41–a to lead 46, the pole face 38–a being north. Operation of switch 41 causes current flow in an analogous manner in the opposite direction in winding 38–b so that pole face 38–a becomes south and establishes current flow in winding 39–b to cause pole face 39–a to become north.

Conventional means may be provided for neutralizing or removing the magnetic zones from the medium 6, or the magnetizers 36, 37, 38 and 39 may be selectively energized with a varying alternating current for removing individual zones. Thus, the lower contact 44–b of the switch 44 is connected to one terminal of a rheostat 52, the other terminal of the rheostat being connected to one side of a source of A. C. 53 of suitable amplitude. The other side of the source 53 is adapted to be connected to the lead 46 by switch 32. Thus, if switch blade 44–c is depressed to open contact 44–a and close against contact 44–b, one side of the A. C. source 53 will be substituted for the positive lead 50 and operation of switches 41, 42 or 43 thereafter will selectively energize the windings 36–b, 37–b, etc., as before. However, since the current is alternating, the pole faces 36–a etc., associated with the energized windings will change rapidly from north to south and vice-versa, and as the strength of the magnetic field is reduced by means of the rheostat 52, any magnetism in the adjacent portion of the medium 6 is reduced to zero in a well understood manner.

The magneto responsive means O comprises a plurality of operators 60, 61 and 62 arranged to respond respectively to magnetic zones impressed on the medium 6 by the pairs of magnetizers 36—37, 37—38, and 38—39. Since these operators 60, 61 and 62 are substantially identical, only one will be described, corresponding parts being indicated by the addition of the same letters to numerals 60, 61 or 62 as the case may be. Although these operators are shown as including members movable longitudinally of the control medium in response to the magnetic zones thereon, this is by way of example only, since such members might be otherwise arranged, as for instance, to move transversely of the medium.

Figures 2, 3, 4:
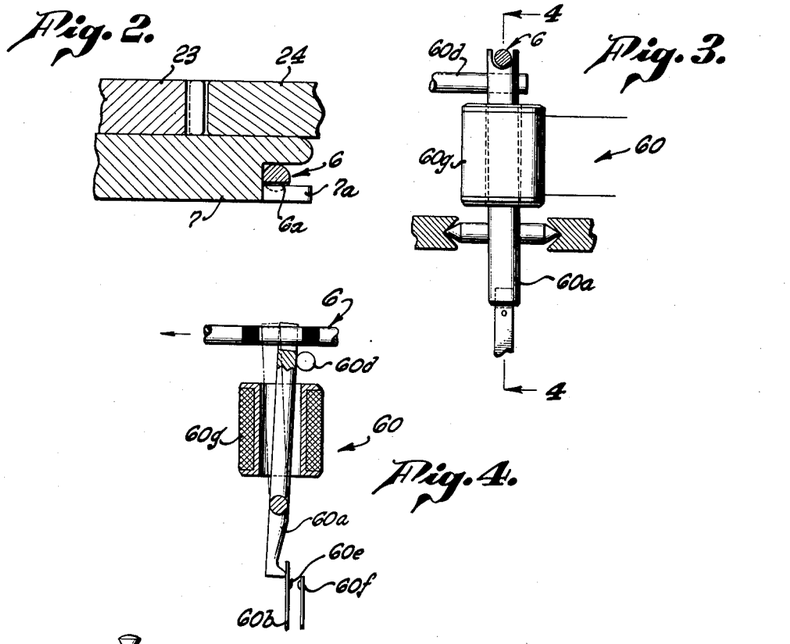
Figures 2 and 3 are detail cross sections, taken substantially as indicated by the correspondingly numbered lines of Figure 1.
Figure 4 is a section taken substantially as indicated by line 4—4 of Figure 3.

Referring to Figures 3 and 4, an armature 60–a comprising a bar of magnetic material of low retentivity is pivotally mounted with one end adjacent the medium 6 for movement longitudinally thereof, said end being notched or U-shaped to accommodate the medium 6 and thus reduce the air gap. The opposite end of the bar 60–a engages a resilient switch arm 60–b which normally maintains arm 60–a against a stop 60–d and contacts 60–e, 60–f open. A winding 60–g is provided which when energized magnetizes the armature 60–a, the direction of the winding and the current flow being so chosen that the end of the armature adjacent the medium 6 becomes a south magnetic pole.

The arrangement is such that with the winding 60–g energized, when a magnetic zone is appropriately positioned with respect to the armature 60–a, the armature will operate the switch arm 60–b to close the contacts 60–e and 60–f. As previously explained, the magnetizers M are so arranged that the magnetic zones are impressed with the north pole leading as the medium 6 advances. Accordingly, by energizing the winding 60-g when the zone straddles the armature 60-a as illustrated in Figure 4, very effective use is made of the magnetic flux of the zone. While the magnetizers M and the operators O are described as having certain polarities, it is to be understood that this is by way of example only, and the polarities could as well be opposite to those specified, the relation between them being the important feature.

To prevent possible interaction between the armatures 60-a, 61-a and 62-a such as might occur if they were magnetized at the same time, the switches 33, 34 and 35 are arranged to close successively and after the preceding switch has opened. Thus, as indicated in Figure 1, the cam engaging portions respectively of the switches 33 and 34, as well as of switches 34 and 35, are separated by angles greater than the angular spacing of the cam surfaces 30-a. The angular separation is such that the switch 33 is closed and opened before switch 34 is closed, switch 34 being closed and opened before switch 35 is closed, switch 35 being opened before switch 33 is again closed. Accordingly, the coils 60-g, 61-g and 62-g are energized successively, the operators 60, 61 and 62 being spaced along the control medium 6 by an angular distance from the magnetizers 36, 37, etc., differing from the appropriate number of the effective sections on the medium by amounts corresponding with the angular displacement of the switches 33, 34 and 35 from 90° separation.

Thus, the switch 33 is arranged to be closed when a magnetic zone impressed on the control medium 6 by magnetizers 37 and 38 has been advanced by movement of the medium a distance corresponding with a number of effective sections, the operator 60 being spaced a corresponding distance from a point between the magnetizers 36 and 37. Since switch 34 closes a little later, the operator 61 controlled thereby is spaced from the magnetizers 37 and 38 by the same angular distance plus an amount such that a magnetic zone impressed on the control medium 6 by the magnetizers 37 and 38 will be in operative relation with the operator 61 when switch 34 is closed. Similarly, the spacing of operator 62 from the corresponding magnetizers 38 and 39 is increased in accordance with the later closing of switch 35 so that a magnetic zone created on the medium 6 by the magnetizers 38 and 39 will be in operative relation with the operator 62 when switch 35 is closed.

The foregoing described preselector mechanism will serve optionally to impress an electrical impulse of brief duration on any one of three devices or loads L-1, L-2 and L-3 for controlling the operation thereof at the beginning of any fifteen minute interval throughout a twelve hour period.

Obviously, by providing an appropriate number of magnetizers and operators other than as shown and described, a desired number of loads other than three may be controlled. Further, by advancing the control medium at a rate other than one section over fifteen minutes, the interval between selections may be altered.

An important field of utility for the preselector mechanism is in connection with a radio receiver for preselecting desired programs. For this purpose, the loads L-1, L-2 and L-3 may comprise the windings respectively of relays 73, 74 and 75 controlling pre-tuned circuits in the receiver and arranged to be deenergized automatically at the end of each fifteen minute period. Thus, in the mechanism shown, it would be possible to preselect any one of three programs every quarter hour throughout a twelve hour period. However, it is to be understood that such windings may be arranged to perform any desired control function in response to their energization.

The relays 73, 74 and 75 are substantially identical, hence only one will be described, it being understood that corresponding parts are indicated by the addition of corresponding letters to the appropriate numeral 73, 74 or 75, as the case may be. Thus, relay 75 comprises an electro-magnet 75-a incorporating the winding L-3, which when energized, causes the armature 75-b to move downwardly against the force of a light tension spring 75-c and actuate a pretuned circuit in a conventional manner. When in its lower position, the armature 75-b closes against a contact 75-d establishing a holding circuit maintaining the winding L-3 energized until the end of the fifteen minute period when the winding is deenergized in a manner to be discussed presently. While the relays are shown and described as employing electrical holding means, it is to be understood that known stepping relays, or relays employing mechanical holding means may be used in lieu thereof if desired.

The switch 32 comprises a switch arm 32-a connected with the negative side of the D. C. source 40 by lead 45 and having front and back contacts adapted respectively to close against contact 32-b connected with lead 46 and against contact 32-c connected with lead 72. The arm 32-a has a cam engaging surface 32-d thereon for engaging the cam teeth 30-a, 30-b, etc., so formed as to maintain the switch arm closed against contact 32-b during a small angular movement of the cam 30. This provides some tolerance in the period during which the magnetic zone may be impressed on the medium 6, obviating the necessity of setting the medium exactly to the beginning of the fifteen minute period. This surface 32-d has a high point 32-e adjacent the end first engaged by the cam tooth 30-a, etc.

The arrangement is such that switch arm 32-a normally is closed against contact 32-c but not against contact 32-b. When the high point 32-e of the cam engaging surface is engaged by a cam tooth such as 30-a, switch arm 32-a opens contact 32-c and closes contact 32-b. The engagement of a cam tooth with the high point 32-e causing opening of the contact 32-c, is only momentary after which the contact is again closed by the arm 32-a. However, the contact 32-b is maintained closed thereafter for a brief interval as just pointed out, as long as the cam tooth is in engagement with surface 32-d.

The operation of the mechanism will now be described. With all parts as shown in Figure 1, the control medium 6 is in position to have a magnetic zone impressed thereon, being positioned so that the magnetizers M are substantially intermediate the ends of an effective section thereon. Accordingly, the cam 30 is positioned to close switch contact 32-b as just discussed, connecting lead 46 with the negative side of the D. C. source 40 by lead 45. Assume now that switch 41 is closed briefly to energize magnetizers 38 and 39 and impress a magnetic zone on the medium 6. The motor 10 being in operation, the medium 6 advances and since the above-mentioned zone is separated from the operators O by four sections, it will take approximately one hour for this zone to reach the operators. Thus, the clock C which indicates a quarter past six when the zone is impressed will indicate a quarter past seven when the selection becomes effective, which is the time shown by the indicator I when the selection was made.

As the control medium 6 is advanced from impulse receiving position, corresponding rotation of cam 30 causes cam tooth surface 30-a to release switch 32 allowing it to open so that the magnetizers 36 to 39 can no longer be energized until movement of the medium 6 brings another section thereof into proper relation with the magnetizers at which time corresponding rotation of cam 30 will have brought another cam surface 30-b into position to again close switch 32. In this way, the impression of magnetic zones on the medium 6 other than in proper and consistent spaced relation with respect to the operators O is prevented.

A magnetic zone impressed by magnetizers 38 and 39 is to actuate the operator 62, the operators 61 and 60 being for actuation by zones impressed by magnetizers 37 and 38, and 36 and 37 respectively. To insure actuation of the selected load as well as accurate timing of the energization and deenergization thereof, the switches 33, 34 and 35 control energization of the loads L–1, L–2 and L–3 respectively in addition to controlling energization of the operator coils 60–g, 61–g and 62–g.

Switch 35 is typical and comprises a switch arm 35–a shown as engaged by cam tooth 30–b to close against the front contact of an arm 35–b. This establishes a circuit from positive lead 50 through lead 66 to winding 62–g and thence via leads 67, switch arms 35–a and 35–b and lead 45 to D. C. source 40, magnetizing the armature 62–a, which acts in response to the magnetic zone previously created by magnetizers 38 and 39 to close contacts 62–e and 62–f.

Closing of the contacts 62–e and 62–f does not cause energization of the winding L–3. Thus, switch 35 has an arm 35–c with a contact adapted to be closed by a back contact on arm 35–b just after contact 35–a is closed and connected to the switch arm carrying contact 62–f by lead 68. The arm carrying the other contact 62–e is connected to one terminal of the winding L–3 by lead 69, the other terminal being connected to the positive lead 50. Thus, the winding L–3 is energized by the closing of contact 35–c which occurs after the closing of the contacts 62–e and 62–f, ensuring accurate timing of such energization as well as avoiding the need of closing the contacts 62–e and 62–f under load. Conversely, the contact 35–c is opened before the contact 35–a is opened.

Energization of the electro-magnet 75–a causes movement of the armature 75–b to attracted position which as previously pointed out may operate conventional mechanism connecting a pretuned circuit for operation in a radio receiver, and establishes a holding circuit maintaining the winding L–3 energized independently of contacts 62–e and 62–f and 35–c. This holding circuit is from the positive lead 50, through the winding L–3, lead 75–e, contact 75–d, contact 75–f on the armature 75–b, lead 70, normally closed switch 71, lead 72, normally closed contact 32–c, switch arm 32–a to the source 40 via lead 45. These conditions prevail until just prior to the close of the fifteen minute period, when the rotation of cam 30 causes cam tooth 30–b to engage the high point 32–e, opening contact 32–c. This deenergizes the winding L–3 releasing the armature 75–b which returns to initial position, and all parts are ready for another cycle of operations. Thus, the winding L–3 is deenergized independently of the contacts 62–e and 62–f, which thus are not required to open under load. In the event that a holding circuit is not used for the winding L–3, the opening of the contact 35–c before contact 35–a is opened, will likewise avoid the opening of contacts 62–e and 62–f under load.

The windings 61–g and 60–g of the operators 61 and 60 are similarly energized by switches 34 and 33 respectively at appropriate times to coincide with the arrival of magnetized zones created by magnetizers 37 and 38, or by 36 and 37 in operative relation with the respective operators. The switches 34 and 33 also control the energization of windings L–2 and L–1 respectively, the relay magnets 74–a and 73–a subject to the closing of the switch contacts 61–e and 61–f, and 60–e and 60–f of the operators 61 and 60. The relays 74 and 73 have holding circuits similar to that just described in connection with relay 75, and the windings L–2 and L–1 are deenergized at the end of the fifteen minute period by the opening of contact 32–c.

As discussed hereinbefore, in the embodiment of Figure 1, the magnetic zones are impressed on the control medium 6 four sections behind the operators, or on a time basis, one hour before they reach the operators O. Accordingly, the indicia 15 on the indicator I is positioned one hour behind that of the clock C. Thus, as shown, the hands of the clock C indicate 6:15; this however is not necessarily an indication of time but may be considered more accurately an indication of the position of the medium 6 with respect to the operators O. The hands of the indicator I show 7:15 which is the indication that clock C will give when the magnetic zone impressed in this position of the control medium 6 will actuate the selected operator. Similarly, the indicator I may be considered as showing the position of the control medium 6 with respect to the magnetizers M.

To enable the actuation of a selected operator at a chosen future time, the control medium 6 is arranged to be moved independently of the driving motor 10, the time at which any effective section of the control medium 6 will reach the operating position being shown by the indicator I. Thus, by moving the gear 21 to disconnected position and operating the knob 25 until the time at which the selected operation is desired to occur is shown by the indicator I, the proper section on the medium is in position to have a magnetic zone impressed thereon by a chosen pair of the magnetizers M, which for this purpose are then energized as previously discussed. The medium 6 may then be adjusted to bring another section into position for having a magnetic zone created thereon by the same or a different pair of the magnetizers, to actuate a desired operator at a different time as shown by the indicator I. As many zones as desired up to the total number which the medium 6 is capable of receiving may be impressed in this way, any unwanted zones being removed as previously discussed. While the gear 21 is in the disconnect position switch 71 is open, preventing energization of the load windings 73–a, 74–a and 75–a.

To restore the mechanism to operative condition after the impression of such zone or zones, the knob 25 is rotated to bring the indicator hands 16 and 18 into positions corresponding with the clock hands 12 and 14, as shown in Figure 1, and arm 22 is moved to return the gear 21 to engagement with gears 19 and 20 so that the medium 6 will be advanced by the motor 10.

Advance of the medium 6 to a position for receiving a magnetic zone for a preselected operation at a future time, may cause previously impressed zones to reach the operators O at other than the proper times for energizing the loads L-1, L-2, or L-3. Accordingly, means are provided preventing energization of the loads whenever the medium 6 is disconnected from the driving motor 10. Thus, the common lead 70 from the loads L-1, L-2 and L-3 is connected to one side of a normally closed switch 71, the other side being connected by leads 72 to switch contact 32-c as previously discussed. The switch 71 may be arranged to be opened in any suitable manner in response to movement of the gear 21 to a position in which gears 19 and 20 are disconnected.

Figure 5:
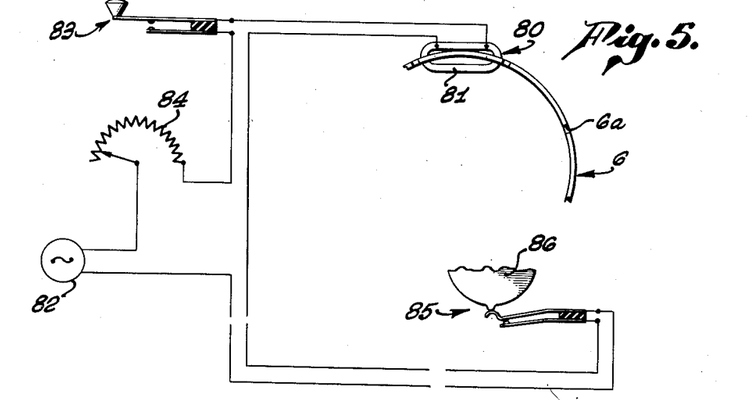
Figure 5 is a schematic view showing a modified form of mechanism for erasing a selection from the control medium.

An alternative form of apparatus for demagnetizing the control medium 6 is shown in Figure 5. This form comprises an electromagnet 80 having a pole piece extending normally of the plane of the medium 6 with an elongated pole face 81 closely spaced from the medium. This pole face 81 has a length approximately equal to that of one of the effective sections on the medium, so all magnetism in the section can be removed by a single operation.

This form of demagnetizer can be used with the apparatus of Figure 1 instead of the arrangement disclosed therein, the magnet 80 being positioned to be in operative relation with that section of the medium 6 adjacent the magnetizing means M and at a right angle with respect to the magnetizers 36, 37 etc.

The winding of the electro-magnet 80 is arranged to be connected with one terminal of an A. C. source 82 by a manually operable switch 83, a rheostat 84 between the source 82 and the switch 83 serving to vary the current. A cam operated switch 85 is interposed between the other terminal of source 82 and the winding of the magnet 80, and serves to prevent energization of the magnet 80 except when a section in the control medium is properly positioned with respect to the magnet. For example, the cam member 86 operating switch 85 may be the same as cam 30 and be driven with the medium 6 in the manner of the cam member 30 of Figure 1.

Figures 6, 7, 8, 9, 10:
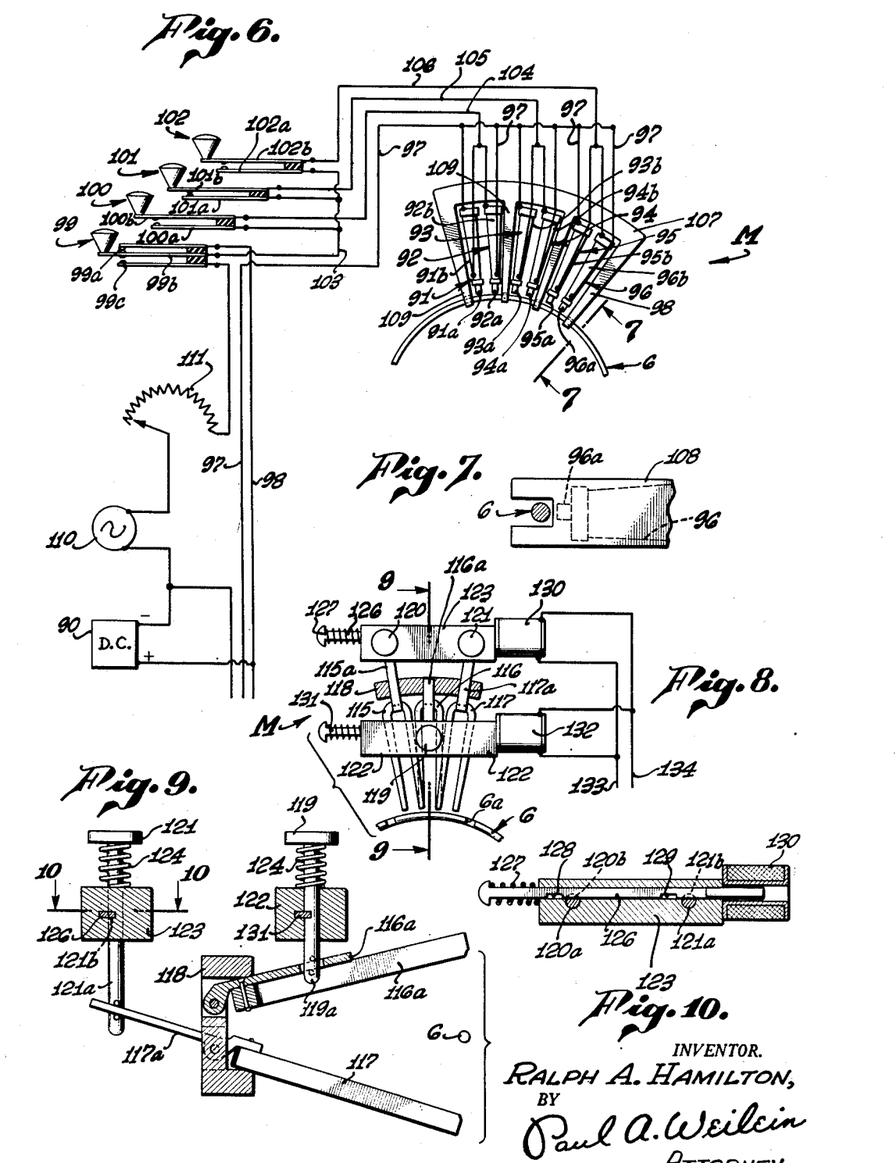
Figure 6 is a schematic view showing a modified form of mechanism for impressing a selection on the control medium.
Figure 7 is a detail cross section, taken substantially as indicated by line 7—7 of Figure 6.
Figure 8 is a schematic view showing a modified form of mechanism for impressing a selection on the control medium.
Figure 9 is a detail cross section, taken substantially as indicated by line 9—9 of Figure 8.
Figure 10 is a detail cross section, taken substantially as indicated by line 10—10 of Figure 9.

Figure 6 shows an arrangement wherein the magnetizing means M comprises an independent pair of magnets for impressing each magnetic zone on the control medium 6. This enables the optional creation of a plurality of zones in the same section of the medium 6 for causing simultaneous operation of any or all of the loads L-1, L-2, etc. Further, any zone or zones may be removed selectively as desired without effecting other zones in the section. It is to be understood that the medium 6 is driven in the same manner as shown in Figure 1 and serves to actuate a similar group of operators O.

The magnets are indicated by the numerals 91—92, 93—94 and 95—96, having respectively pole faces 91-a, 92-a, 93-a, 94-a, 95-a and 96-a adjacent the medium 6 and accommodated within the length of one of the effective sections on the medium 6. The magnets have energizing windings 91-b, 92-b, etc., arranged to be optionally connected with the D. C. source 90. The spooling of the windings and the direction of the current are so related that the odd numbered pole faces when energized become south magnetic poles, the even numbered pole faces becoming north magnetic poles. Thus, magnetic zones with the north pole leading, similar to those of the first described form of the invention may be impressed on the medium 6.

As shown by way of example, the windings 91-b, 92-b, etc., are all spooled in the same direction and the current is caused to flow in opposite directions in each pair of windings. Thus, the negative lead 97, corresponding to lead 46 in Figure 1, is connected with the upper ends of the windings 91-b, 93-b and 95-b, and with the lower ends of the windings 92-b, 94-b, and 96-b. The positive lead 98 is connected with the upper contact 99-a of a switch 99 which is normally closed against the switch arm 99-b. Switch arm 99-b is connected with the bottom contacts 100-a, 101-a, and 102-a, of the normally open switches 100, 101 and 102 respectively by lead 103.

Arm 100-b of switch 100 is connected by lead 104 with the lower end of winding 91-b and the upper end of winding 92-b. Thus, if switch 100 is closed, current will flow from the D. C. source 90 via lead 98, contact 99-a, arm 99-b, lead 103, contact 100-a, arm 100-b, lead 104 to windings 91-b and 92-b, thence via the negative lead 97 to the D. C. source, it being understood that the lead 97 is connected to the source through a cam controlled switch having a switch arm such as 32-b of switch 32 of Figure 1, and a normally open contact 32-b, to insure proper location of the impressed magnetic zones on the control medium 6.

Similarly, switch arm 101-b, is connected by lead 105 to windings 93-b and 94-b, and switch arm 102-b is connected by lead 106 to windings 95-b and 96-b, so that closing of switch 101 or 102 causes energization of the associated windings in an analogous manner. Obviously, any or all of the switches 100, 101, or 102 may be operated simultaneously to create several magnetic zones on the medium 6 in the same section. It may be desirable to isolate the pairs of magnetizers 91—92, 93—94, and 95—96 as by a soft iron shield 107 providing pairs of arms as 108 and 109 extending over the medium 6.

To selectively remove the magnetic zones from the medium 6, switch arm 99-b is operated to open the contact 99-a and close against the contact 99-c. This substitutes one side of the A. C. source 110 for the positive lead 98 so that upon closing any of the switches 100, 101 and 102, alternating current, varied by the rheostat 111 will be supplied to the associated windings 91—92, 93—94 and 95—96, erasing the zone as before.

It is possible to eliminate the energizing windings as provided on the previously discussed forms of magnetizers, and employ permanent magnets for this purpose. Thus, Figures 8, 9 and 10 show magnetizing means wherein permanent horseshoe magnets 115, 116 and 117 are provided for impressing magnetic zones on the control medium 6. These magnets are independently movably mounted with their pole faces normally spaced at a distance from the control medium 6 such that the control medium is unaffected thereby, means being provided for optionally moving any of the magnets to bring the pole faces thereof into the immediate proximity of the medium 6 to cause a magnetic zone to be impressed thereon.

Thus, as shown in Figures 8 and 9, the magnets 115, 116 and 117 respectively have hinge plates 115-a, 116-a and 117-a secured thereon by the aid of which the magnets are pivotally mounted for independent movement on a supporting bar 118.

Operating keys 119, 120 and 121 are provided for manipulating the magnets 115, 116 and 117 respectively, the keys having stems 119-a, 120-a and 121-a slidable in frame members 122 and 123, and secured to the respective hinge plates to move therewith. A compression spring 124, confined between each of the keys 119, 120, and 121 and the frame bar 122 or 123, normally urges the associated magnet to inactive position. When it is desired to impress a magnetic zone on the medium 6, pressure is exerted on the appropriate key to swing the magnet controlled thereby into operative relation with the control medium 6, the resultant magnetic zone being substantially the same as that formed in the previously described forms of the invention.

Means are provided to insure proper placement of the magnetic zones on the medium 6 with respect to the effective sections thereon, as previously discussed. For this purpose a reciprocable latch bar 126 is slidably mounted in a suitable channel formed in the frame member 123 (see Figure 10) and is normally maintained in engagement with notches 120-b and 121-b respectively in key stems 120-a and 121-a by a compression spring 127, preventing movement of the keys 120 and 121.

The bar 126 has a pair of spaced openings 128 and 129 which upon appropriate movement of the bar 126 against the force of spring 127 are adapted to align with the stems 120-a and 121-a and release the keys 120 and 121. A solenoid 130 is provided for moving the latch bar 126 to key releasing position, when energized. A similar latch bar 131 operated by solenoid 132 is provided for normally preventing operation of key 119.

The solenoids 130 and 132 are arranged to be supplied with current by leads 133 and 134 corresponding respectively with leads 46 and 50 of the first described form of the mechanism and energized similarly by a cam operated switch upon arrival of the medium 6 in proper position to have a magnetic zone impressed thereon.

It is also possible to eliminate the energizing coils for the operator armatures, and employ permanently magnetized bars for the armatures. Thus, in Figure 11, a plurality of operators 140, 141 and 142 are shown corresponding respectively with the operators 60, 61 and 62, having permanently magnetized armatures 140-a, 141-a and 142-a, and pivotally mounted with their south magnetic poles adjacent the control medium 6 for limited movement longitudinally thereof. The armatures 140-a, 141-a and 142-a respectively are adapted to operate the switch contacts 140-e and 140-f, 141-e and 141-f, and 142-e and 142-f to close, and are urged against the stops 140-d, 141-d and 142-d by the resilient switch arms 140-b, 141-b and 142-b.

Figure 11:
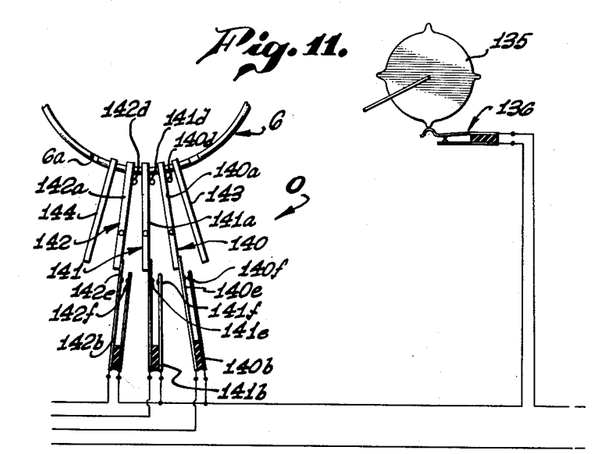
Figure 11 is a schematic view showing a modified form of operating mechanism.

A modified form of switching arrangement is provided for controlling the energization of the loads in connection with the switch contacts 142-e, 142-f, etc. Thus, a rotatable cam member 135 is provided, corresponding with the cam member 30 of Figure 1 and arranged to close a switch 136 each time an effective section of the control medium 6 arrives in operating relation with respect to the operators O. These operators are spaced along the control medium 6 in accordance with the spacing of the magnetizers, so that a magnetic zone impressed by any of the magnetizers will reach the corresponding operator after substantially the same amount of advance of the control medium. Accordingly, only the operator or operators corresponding with the chosen magnetizer or magnetizers will be in position after such advance, closing the corresponding switch or switches 140-e and 140-f, 141-e and 141-f or 142-e and 142-f. Thus, by providing the switch 136 in series with each of these switches and which is arranged to close after the arrival of the magnetic zone in operative relation with the appropriate operator, energization of the chosen load is assured.

To prevent displacement of the armatures 140-a, etc., due to the interaction of their magnetic fields, permanent magnets 143 and 144 having the same polarity and strength as the armatures 140-a, etc., are fixed respectively adjacent the outermost armatures 140-a and 142-a at suitable distances therefrom, to neutralize these fields so that the armatures are magnetically balanced and will respond properly to a magnetic zone when present, on the control medium 6.

Figures 12, 13:
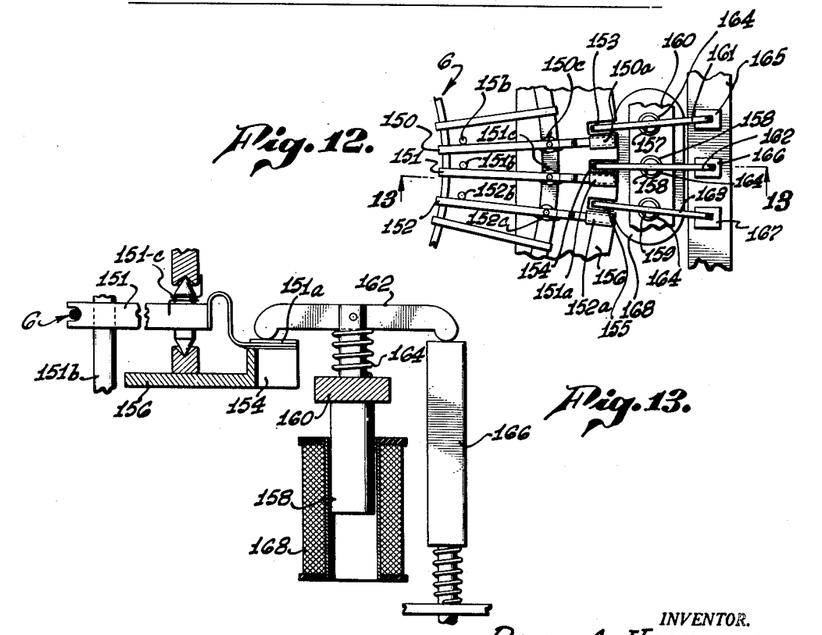
Figure 12 is a schematic view showing another modified form of operating mechanism.
Figure 13 is a cross section on an enlarged scale, taken substantially as indicated by line 13—13 of Figure 12.

The armatures of either type of operator may be arranged to mechanically perform control of a function if desired. Such an arrangement is illustrated schematically in Figures 12 and 13, the armatures 150, 151 and 152 being shown by way of example as of the permanent magnet type, just discussed. The outer ends of the armatures are provided respectively with abutment forming means 150-a, 151-a and 152-a adapted to overlay slots 153, 154 and 155 in a stationary member 156 upon movement of the armature in response to a magnetic zone on the medium 6. The armatures 150, 151 and 152 are normally maintained against their respective stops 150-b, 151-b, and 152-b by light torsion springs 150-c, 151-c and 152-c in which position the abutment forming means clear the respective slots, as shown in Figure 12.

A plurality of magnetic members 157, 158 and 159 are slidably supported in a bar 160 adjacent the ends of the armatures 150, 151 and 152 carrying the abutment forming means and have rocker arms 161, 162 and 163 pivotally mounted on their upper ends respectively. A light compression spring 164 is provided for respectively urging each member 157, 158 and 159 to its upper position. Corresponding ends of the rocker arms 161, 162 and 163 extend respectively over the slots 153, 154 and 155 which they are adapted to enter freely, the opposite ends engaging the spring pressed plungers 165, 166 and 167 which it is desired to actuate. A common solenoid 168 is provided for operating the members 157, 158 and 159.

The arrangement is such that the solenoid 168 when energized draws the members 157, 158 and 159 simultaneously downward. With the armatures in their normal inoperative positions, slots 153, 154 and 155 are unobstructed so that the rocker arms 161, 162 and 163 tilt downwardly about their respective ends on the plungers 165, 166, and 167, their opposite ends freely entering the respective slots.

If however one or more of the armatures, for example the one marked 151, has been moved to its operative position by a magnetic zone on the control medium 6 so that the abutment forming means 151-a blocks the slot 154, the rocker arm 162 will be caused to tilt downwardly about said means so that its opposite actuates the plunger 166.

The solenoid 168 is appropriately energized upon the arrival of a magnetic zone in operative relation with the chosen operator. For this purpose, a cam operated switch such as 136 in the previously described form of mechanism may be employed.

Figure 14:
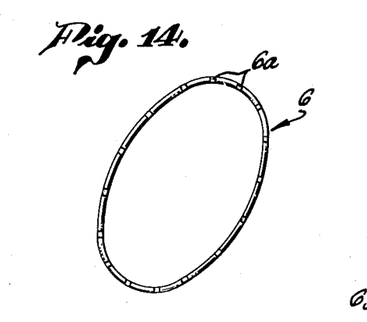
Figure 14 is a perspective view of one form of control medium.

As previously indicated, the control medium 6 may be a magnetically permeable wire or tape of small cross section. It should be of high magnetic retentivity and have a capability of magnetizing in a lengthwise direction. As an example of a suitable material, wire having a diameter of .055" and commercially available under the trade name of "Cunife" is cited. The length of the wire or medium required depends on the number of selections to be accommodated. If only a few selections are required, the medium may be in the form of a single loop, as shown in Figure 14, or otherwise.

Figure 15:
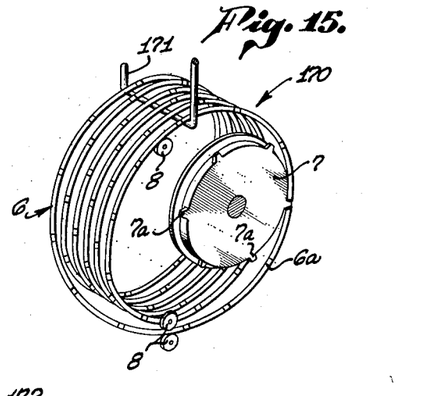
Figure 15 is a similar view, showing another form of control medium.

If the desired number of selections is such as to require a loop which is momentarily large, the medium may be in the form of a helix 170 as shown in Figure 15, or it may be jumble wound. In either case, the endmost turn or loop is maintained spaced from the other turns as by the driver 7 and supporting rollers 8, the other turns being supported as by a roller or hook 171. Rotation of the helix by the driver 7 will cause the medium to pass over the driver to the outer end of the helix thence into the helix and back to the driver, the resilience of the wire serving to maintain the form of the winding.

Figure 16:
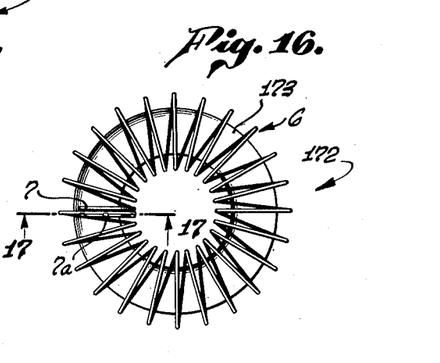
Figure 16 is a plan view of still another form of control medium.
Figure 17:
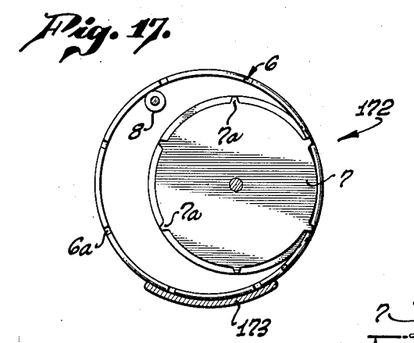
Figure 17 is a cross section taken substantially as indicated by lines 17—17 of Figure 16.

If the helix is of sufficient length it may be arranged as a toroid 172, Figure 16. Additional means may be provided for supporting and guiding the toroid 172 comprising a concave annular pan 173 (Figures 16 and 17) in which the winding slidingly rests.

Figure 18:
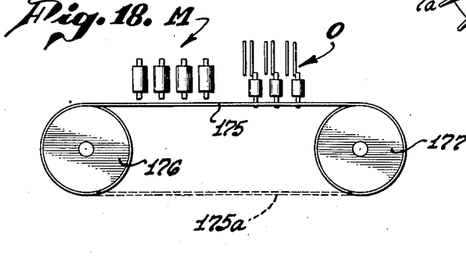
Figure 18 shows a modified form of apparatus employing another form of control medium.

The control medium optionally may be straight with the magnetizers M and magneto responsive operators O appropriately arranged as shown in Figure 18. These magnetizers and operators may be of any of the types discussed hereinbefore. The medium 175 may be discontinuous, being wound on a drum or spool 176 driven at a suitable rate from a drum 177, the magnetizers and operators being intermediate said drums. If preferred the medium 175 may be continuous passing between the drums 176 and 177 in the manner of a belt as indicated by the broken line 175-a.

Figures 19, 20, 21:
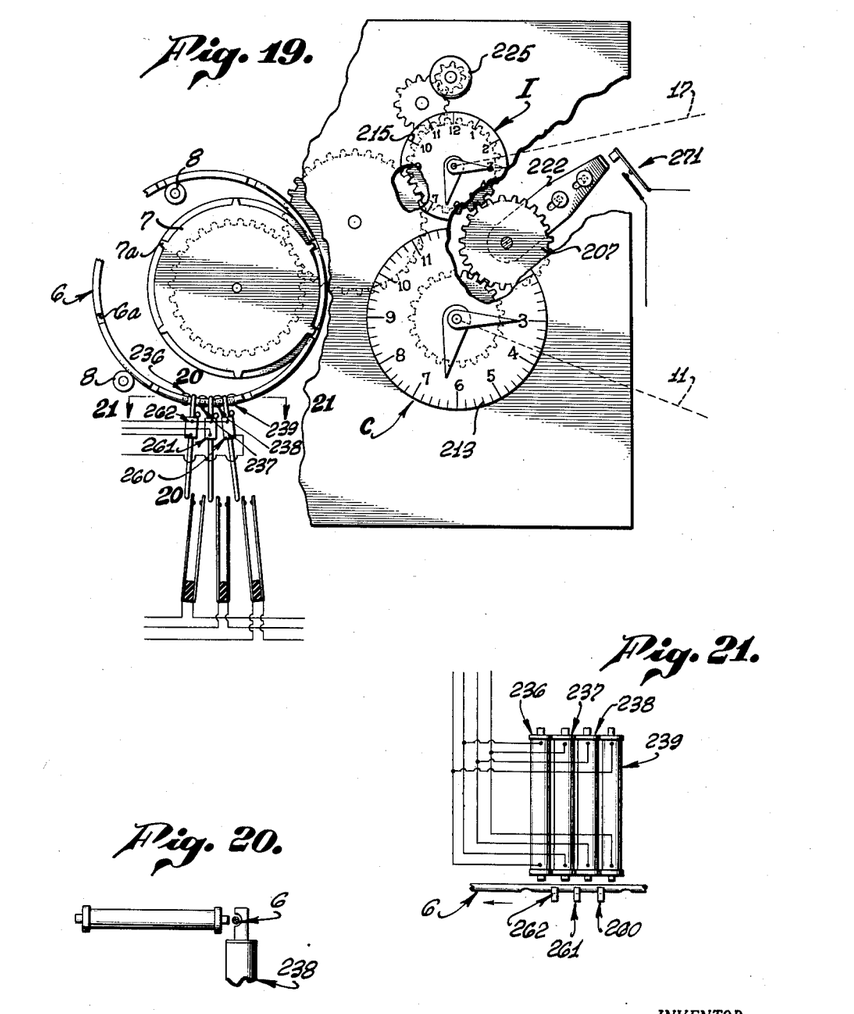
Figure 19 is a schematic view showing still another modified form of the invention.
Figures 20 and 21 are detail sections taken substantially as indicated by the correspondingly numbered lines of Figure 19.

It is not necessary that the magnetizers M be positioned at a distance along the medium 6 from the operators O as in the previously discussed forms of the invention; the magnetizers may be displaced angularly about the medium 6 from the operators as shown in Figures 19, 20 and 21, and so positioned that a magnetic zone created by the magnetizers will be in actuating position with the proper operator without the necessity of moving the medium 6. However, in such an arrangement the medium 6 is arranged for movement as before, enabling preselection of the operator to be actuated. Such an arrangement has important advantages in that the apparatus may be more compact and the indicia on the indicator I is not required to be angularly offset with respect to that of the clock C.

The driving and switching arrangements in the form of Figure 19 may be identical with those in the form of Figure 1 and accordingly will be referred to only briefly as it is believed readily understood that the switches 32, 33, 34 and 35 and their operation by cam 30 will be unchanged since the magnetizers M in the modified form of Figure 19 are displaced along the medium 6 by a distance corresponding with one hour's movement of the medium and one complete revolution of the cam 30.

Referring to Figures 19, 20 and 21 the operators are indicated by the numerals 260, 261, and 262 and are shown as substantially identical with the operators 60, 61 and 62 of Figure 1, other parts similarly bearing the numeral of the corresponding part in Figure 1 with the addition of the number two hundred. The magnetizers 236, 237, 238 and 239 thus correspond respectively with the magnetizers 36, 37, 38 and 39 of Figure 1, but as clearly shown in Figures 20 and 21 are disposed at an angle about the medium 6 with respect to the operators O, shown by way of example as a right angle, and straddling the respective operators 260, 261 and 262 so that a magnetic zone created on the medium by any adjacent pair of the magnetizers will be properly positioned to actuate the respective operator without the need of moving the control medium 6. Accordingly, the indicia 215 of the indicator I which shows the time at which a preselected operation is to occur is consistent with the indicia on the face 213 of the clock C which indicates the position of the medium 6.

By manipulating the arm 222 to disconnect the driver 207, the control medium 6 may be advanced by means of knob 225 to have a magnetic zone impressed therein for actuating a chosen operator at a future time, shown by the indicator I, in the same manner as in the form of Figure 1. Such disconnecting operation opens the switch 271 corresponding to switch 71, preventing energization of the load windings as in the form of Figure 1, until the medium 6 is reconnected in driving relation with the clock C.

I claim:

1. In a preselector mechanism: a movable, elongated magnetically permeable control medium, having a plurality of substantially equal sections thereon defined by units of advance; means for advancing said medium along a predetermined path; an operator adapted to respond to a magnetic zone on said medium; optionally operable magnetizing means positioned adjacent said path and spaced from said operator; means rendering said magnetizing means effective upon successive operations, to impress a magnetic zone on said medium at a corresponding point in each of said sections; and means rendering said operator effective upon arrival of said corresponding place in each section in predetermined relation with the operator.

2. In a preselector mechanism: a movable, elongated magnetically permeable control medium, having a plurality of substantially equal sections thereon defined by units of advance; means for advancing said medium along a predetermined path; an operator adapted to respond to a magnetic zone on said medium; optionally operable magnetizing means positioned adjacent said path and spaced from said operator; means rendering said magnetizing means effective upon successive operations, to impress a magnetic zone on said medium at a corresponding point in each of said sections; means for optionally moving said medium independently of said advancing means to alter the number of sections between said zone and said operator; and means rendering said operator effective upon arrival of said corresponding place in each section in predetermined relation with the operator.

3. In a preselector mechanism: a movable, elongated magnetically permeable control medium, having a plurality of substantially equal sections thereon defined by units of advance; means for advancing said medium along a predetermined path; means indicating the advance of said medium along said path; an operator adapted to respond to a magnetic zone on said medium; optionally operable magnetizing means positioned adjacent said path and spaced from said operator; means for moving said medium independently of said advance; means rendering said magnetizing means effective upon successive operations, to impress a magnetic zone on said medium at a corresponding point in each section; indicator means indicating the independent movement of said medium; and means optionally connecting said indicator for indicating the advance of said medium.

4. In a preselector mechanism: a movable elongated magnetically permeable control medium; means for advancing said medium along a predetermined path in a manner to define sections of substantially equal length therealong; a normally inoperative operator; optionally operable means positioned adjacent said path and spaced from said operator along said medium, for impressing a magnetic zone on said medium; means for rendering said impressing means operable respectively at corresponding points in said sections; and means rendering said operator operative upon arrival of said points in predetermined relation with said operator.

5. In a preselector mechanism: a movable elongated, magnetically permeable control medium; means including a member in positive driving relation with said medium, for advancing said medium in a manner to define sections of substantially equal length therealong; a normally inoperative operator; optionally operable means spaced from said operator along said medium, for impressing a magnetic zone on said medium; means including a switch operated in response to movement of said member, for rendering said impressing means operable respectively at corresponding points in said sections; and means rendering said operator operative upon arrival of said points in predetermined relation with said operator.

6. In a preselector mechanism: a movable elongated, magnetically permeable control medium; means including a member in positive driving relation with said medium, for advancing said medium in a manner to define sections of substantially equal length therealong; a normally inoperative operator; optionally operable means spaced from said operator along said medium, for impressing a magnetic zone on said medium; means for rendering said impressing means operable respectively at corresponding points in said sections; and means including a switch operated in response to movement of said member, for rendering said operator operative upon arrival of said point in predetermined relation with said operator.

7. In a preselector mechanism: a movable elongated magnetically permeable control medium; means including a member in positive driving relation with said medium, for advancing said medium in a manner to define sections of substantially equal length therealong; a normally inoperative operator; optionally operable means spaced from said operator along said medium, for impressing a magnetic zone on said medium; means including a switch operated in response to movement of said member, for rendering said impressing means operable respectively at corresponding points in said sections; and means including a switch operated in response to further movement of said member, for rendering said operator operative upon arrival of said point in predetermined relation with said operator.

8. In a preselector mechanism: a movable elongated, magnetically permeable control medium; means including a member in positive driving relation with said medium, for advancing said medium in a manner to define sections of substantially equal length therealong; a normally inoperative operator; optionally operable means spaced from said operator along said medium, for impressing a magnetic zone on said medium; and means for rendering said impressing means as well as said operator, operable at corresponding points respectively in said sections including common switch means operated in response to movement of said member.

9. In a preselector mechanism: a movable elongated magnetically permeable control medium; means for advancing said medium in a manner to define sections of substantially equal length therealong; a normally inoperative operator; optionally operable means spaced from said operator along said medium, for impressing a magnetic zone on said medium; means driven synchronously with the advancement of said medium for rendering said impressing means operable at corresponding points of the respective sections; optionally operable only means for erasing said zone; and means driven synchronously with the advancement of said medium rendering said operator operative upon arrival of said points in predetermined relation with said operator.

10. In a preselector mechanism: a movable elongated magnetically permeable control medium; means for advancing said medium in a manner to define sections of substantially equal length therealong; a magneto-responsive operator; a permanent magnet mounted for movement toward and away from said medium; means urging said magnet away from said medium; optionally operable means for urging said magnet toward said medium to impress a magnetic zone thereon; and means operating synchronously with such advancement to render said optionally operative means operative only when predetermined portions of said sections lie opposite said magnet.

11. In a preselector mechanism: a movable elongated magnetically permeable control medium; means for advancing said medium in a manner to define sections of substantially equal length therealong; a magneto-responsive operator; a permanent magnet mounted for movement toward and away from said medium; means urging said magnet away from said medium; latch means for preventing movement of said magnet toward impressing position; electro-magnetic releasing means for said latch; and switch means operated in accordance with the movement of said medium for releasing said latch upon arrival of a corresponding point of each section in zone impressing position.

12. In a preselector mechanism: an elongated magnetically permeable control medium; means for optionally impressing a magnetic zone at a chosen point on said medium, said means comprising at least three magnetic poles substantially uniformly spaced along a portion of said medium, and means for selectively operating any pair of adjacent poles to increase their field strength with respect to said medium.

13. In a preselector mechanism: a movable elongated control medium adapted to have a magnetic zone thereon; an operator having an armature mounted with one end adjacent said medium for movement longitudinally thereof; and means including a switch for rendering said operator effective to perform a control function in response to said zone and means operated in synchronism with the movement of said medium past said armature end for operating said switch only when predetermined portions of said medium are adjacent said armature end.

14. In a preselector mechanism: a movable elongated control medium adapted to have a magnetic zone thereon; means including a member in positive driving relation with said medium, for advancing said medium; an operator having an armature mounted with one end adjacent said medium for movement longitudinally thereof; and means including a switch operated by said member for rendering said operator effective to perform a control function in response to said zone.

15. In a preselector mechanism: a movable elongated control medium adapted to have a magnetic zone thereon; an operator having an armature mounted with one end adjacent said medium for movement longitudinally thereof; an energizing winding for said armature; and means including a switch operative to energize said winding to cause said operator to respond to said zone and perform a control function and means operated in synchronism with the movement of said medium past said armature end for operating said switch only when predetermined portions of said medium are adjacent said armature end.

16. In a preselector mechanism: a movable elongated control medium adapted to have a magnetic zone thereon; an operator having an armature mounted with one end adjacent said medium for movement longitudinally thereof; switch means operable by movement of said armature in response to said zone; and mechanism including a switch operative in accordance with the movement of said medium to render said switch means effective to perform a control function when operated; and means operated in synchronism with the movement of said medium past said armature for operating said switch only when predetermined portions of said medium is adjacent said armature end.

17. In a preselector mechanism: a movable elongated control medium adapted to have a magnetic zone theron; means including a member in positive driving relation with said medium, for advancing said medium; an operator having an armature mounted with one end adjacent said medium for movement longitudinally thereof; switch means operable by movement of said armature in response to said zone; and means including a switch operated by said member for rendering said switch means effective to perform a control function when operated.

18. In a preselector mechanism: a movable elongated control medium adapted to have a magnetic zone thereon; an operator having an armature mounted with one end adjacent said medium for movement longitudinally thereof; an abutment carried by said armature; a rocker arm having one end adapted to engage said abutment and the opposite end adapted to engage a plunger; a magnetic member pivoted to said arm intermediate its ends; means resiliently urging said arm and said member to inactive position; a solenoid energized in accordance with the movement of said medium, for moving said arm and said member to active position; said arm normally clearing said abutment; movement of said armature in response to said zone positioning said abutment to engage said arm, whereby to actuate said plunger upon movement to active position.

19. In a preselector mechanism: a movable elongated, magnetically permeable control medium; means including a member in positive driving relation with said medium, for advancing said medium in a manner to define sections of substantially equal length therealong; a plurality of normally inoperative operators spaced along said medium with the length of one of said sections; a corresponding number of optionally operable means, spaced within the length of one of said sections for impressing a magnetic zone on said medium; means including a switch operated in response to movement of said member, for rendering said impressing means operable respectively at corresponding points in said sections; and means rendering the corresponding operator operative when said points are in predetermined relation with said operator.

20. In a preselector mechanism: a control medium comprising a movable flexible elongated magnetically permeable member; and a rotatable member having a circular surface engaging said flexible member, said members respectively having coengaging projections and recesses for maintaining said members in definite driving relation with respect to each other.

21. In a preselector mechanism: a control medium comprising a movable flexible elongated magnetically permeable member, said member being continuously curved; and a rotatable member having a circular surface engaging said flexible member, said members respectively having coengaging projections and recesses for maintaining said members in definite driving relation with respect to each other.

22. In a preselector mechanism: a movable magnetically permeable control medium adapted to have a magnetic zone thereon; an operator adapted to respond to said zone to perform a control function; means including a driven member for advancing said medium to bring said zone to actuating position with respect to said operator; driving means connected to said driven member; clutching means for optionally disconnecting said driving means from said driven means to permit independent movement of said medium; and means operated by said clutching means preventing performance of said control function when said driving means is disconnected.

23. In a preselector mechanism: a movable magnetically permeable control medium adapted to have a magnetic zone thereon; an operator adapted to respond to said zone to control energization of a load circuit; means including a driven member for advancing said medium to bring said zone to actuating position with respect to said operator; driving means connected to said driven member; clutching means for optionally disconnecting said driving means from said driven member to permit independent movement of said medium; and switch means operated in response to disconnection of said driving means from said driven member to prevent energization of said load circuit.

24. In a preselector mechanism; a magnetically permeable control medium adapted to have a magnetic zone thereon, means including a driving member for moving said zone into and out of actuating position; an operator adapted to respond to said zone when in actuating position, to control energization of a load circuit; means maintaining said circuit energized after movement of said zone out of actuating position; and means controlled by said driving member for deenergizing said circuit after a predetermined movement of said medium.

25. In a preselector mechanism: a magnetically permeable control medium adapted to have a magnetic zone thereon; means including a driving member for moving said zone into and out of actuating position; an operator adapted to respond to said zone when in actuating position, to control energization of a load circuit; means responsive to energization of said circuit, maintaining said circuit energized after movement of said zone out of actuating position; and means including a cam-operated switch controlled by said driving member for deenergizing said circuit after a predetermined time interval.

26. In a preselector mechanism: a magnetically permeable control medium adapted to have a magnetic zone thereon; means including a driven member for advancing said medium to bring said zone into and out of actuating position; an operator adapted to respond to said zone when in actuating position, to control energization of a load circuit; means maintaining said circuit energized after movement of said zone out of actuating position; means including a cam switch operated by said driving means for deenergizing said circuit after a predetermined advance of said medium; optionally operable means including clutching means for permitting movement of said medium independently of movement of said driving means; and means including a switch operated by said clutching means for preventing energization of said circuit during independent movement of said medium.

27. In a preselector mechanism: a magnetically permeable control medium adapted to have a magnetic zone thereon; means including a driven member for advancing said medium to bring said zone into and out of actuating position; means including clutching means for optionally disconnecting said driving means from said medium to permit independent movement of said medium; an operator adapted to respond to said zone when in actuating position to cause energization of a load winding; means forming a holding circuit for maintaining said winding energized after movement of said zone out of actuating position; a pair of switch means in said circuit operable to control energization of said winding; and first means driven by said driving means for operating one of said switch means in accordance with a predetermined advance of said medium to deenergize said winding; and second means including a switch operated by said clutching means for preventing energization of said winding when said driving means is disconnected from said medium.

28. In a preselector mechanism: a movable elongated magnetically permeable control medium; means for moving said medium along a predetermined path in a manner to define sections of substantially equal length therealong; a normally inoperative operator; optionally operable means positioned adjacent said path and for impressing a magnetic zone on said medium in actuating relation with said operator; means for rendering said impressing means operable respectively at corresponding points in said sections as the medium is moved; and means rendering said operator responsive to said zone when in actuating relation with said operator.

29. In a method of controlling an operation, the steps which comprise: advancing a movable medium through a detection region, said movable medium having an activating zone of predetermined character impressed locally thereon within at least two but not all of a series of successive sections thereof, detecting whether or not such an activating zone appears on each of said sections at predetermined times as said movable medium passes through said detection region, and initiating the operation or not at each of said times in accordance with whether or not an activating zone exists on the section of said movable medium located in the detection region at each of the respective times.

30. In a method of controlling an operation, the steps which comprise: advancing a movable medium through a detection region, said movable medium having an activating zone of predetermined character impressed locally thereon within at least two but not all of a series of successive sections thereof, detecting whether or not such an activating zone appears on each of said sections at predetermined times as said movable medium passes through said detection region, initiating the operation or not at each of said times in accordance with whether or not an activating zone exists on the section of said movable medium located in the detection region at each of the respective times, and whenever said operation has been initiated at any of such times discontinuing said operation before the next predetermined time.

31. In a method of controlling an operation, the steps which comprise: impressing an activating zone of predetermined character upon some of a series of successive sections of a movable medium but not in others, advancing said movable medium through a detection region while such zones are impressed on said medium, whereby said successive sections of said medium enter said region at predetermined times, detecting whether or not such an activating zone appears on each of said sections at the successive times, and initiating the operation or not at each of said times in accordance with whether or not an activating zone exists in said region at that time.

32. In a method of controlling a plurality of operations, the steps which comprise: establishing within a series of successive sections of a movable medium a position in each section corresponding to each of said operations, creating an activating zone in each of at least two of said positions in different sections, advancing said movable medium through a detection zone having a plurality of detecting positions therein, each detecting position corresponding to one of said operations, detecting whether or not such an activating zone appears in each of said detecting positions at predetermined times as said movable medium passes through said region, and initiating each of said operations or not at each of said times in accordance with whether or not an activating zone exists at the respective detection positions at each of said times.

33. In a method of controlling a plurality of operations, the steps which comprise: establishing within a series of successive sections of a movable medium a position in each section corresponding to each of said operations, creating activating zones in some different positions in different sections, advancing said movable medium through a detection zone having a plurality of detecting positions therein, each detecting position corresponding to one of said operations, detecting whether or not such an activating zone appears in each of said detecting positions at predetermined times as said movable medium passes through said region, and initiating each of said operations or not at each of said times in accordance with whether or not an activating zone exists at the respective detection positions at each of said times.

34. In a method of controlling a plurality of operations, the steps which comprise: establishing within a series of successive sections of a movable medium a position in each section corresponding to each of said operations, creating only one activating zone in each of several different sections, at least one of said zones being created in a different position than another, advancing said movable medium through a detection zone having a plurality of detecting positions therein, each detecting position corresponding to one of said operations, detecting whether or not such an activating zone appears in each of said detecting positions at predetermined times as said movable medium passes through said region, and whenever an activating zone is detected at one of said detecting positions at such times initiating the corresponding operation.

35. In a method of controlling an operation, the steps which comprise: advancing successive sections of a movable medium into an activating region located a predetermined distance along a selected path from a detecting region, creating an activating zone of predetermined character within some of said successive sections but not within others while said medium is located in said activating region, adjusting the position of said medium along said path to establish a predetermined spacial relationship between said sections and said detecting region, thereafter advancing said medium along said path through said activating region and through said detecting region at a predetermined rate while maintaining said activating region inactive, detecting whether or not such an activating zone appears on each of said sections as the medium is advanced through said detection region, and initiating the operation or not at the times that said medium enters said detection region in accordance with whether or not an activating zone exists in said detecting region at the time.

36. In a method of controlling a plurality of operations, the steps which comprise: advancing successive sections of a movable medium into an activating region located a predetermined distance along a selected path from a detecting region, each of said sections having an activation-sensitive position therein corresponding to one of said operations, said detecting region having a plurality of detecting positions differently located therein, said detecting positions corresponding to the respective operations, creating activating zones at different activation-sensitive positions in some of said sections as said medium is advanced through said activating region, adjusting said medium along said path to establish a predetermined spacial relationship between said sections and said detecting region, thereafter advancing said medium through said activating region and said detecting region at a predetermined rate while maintaining said activating region inactive, detecting whether or not such an activating zone appears at the respective detecting positions as each section of said medium is advanced into predetermined spacial relationship with said detection region, and initiating each of the respective operations or not at the times that said medium is advanced into such predetermined spacial relationship in accordance with whether or not an activating zone exists in the corresponding detecting position at the time.

37. In a method of controlling a plurality of operations, the steps which comprise: advancing successive sections of a movable medium into an activating region located a predetermined distance along a selected path from a detecting region, each of said sections having a plurality of differently located activation-sensitive positions therein corresponding to the respective operations, said detecting region having a corresponding plurality of detecting positions therein, creating activating zones at different activation-sensitive positions of said sections, while the respective sections of said medium are located in said activating region, adjusting the position of said medium along said path to establish a predetermined spacial relationship between said sections and said detecting region, thereafter advancing said medium through said activating region and through said detecting region at a predetermined rate while maintaining said activating region inactive whereby successive sections of said medium enter said detecting region at predetermined times, and each activation-sensitive position of the respective sections enters a corresponding detecting position at predetermined times, detecting whether or not such an activating zone appears at the respective detecting positions at each of said latter predetermined times, and initiating the respective operations or not at said times in accordance with whether or not an activating zone exists in the corresponding detecting position at the time.

38. In a preselector mechanism: an elongated magnetically permeable control medium movable along a predetermined path; a plurality of optionally operable magnetizers located along said path for impressing magnetic zones on said medium; a plurality of normally inoperative operators corresponding respectively with said magnetizers located along said path in spaced relation with respect to said magnetizers; means for advancing said medium along said path to advance such magnetic zones from the positions of said magnetizers to the positions of said operators; and means driven synchronously with said medium for selectively energizing said operators to render said operators operative only to detect magnetic zones impressed on said medium by the corresponding magnetizers.

39. In a preselector mechanism: a movable elongated magnetically permeable control medium; means for advancing said medium along a predetermined path in a manner to define sections of substantially equal length therealong; a plurality of magneto-responsive operators positioned along said path within the length of a section; a corresponding plurality of electromagnet means positioned along said path within the length of a section, but spaced in advance of said magneto-responsive operators, for impressing a magnetic zone on said medium for actuating the respective operators; means including a switch for controlling energization of said magnet means; means for synchronizing operation of said switch with advancement of said medium, whereby said electro-magnet means is energizable only at a corresponding point in each section; and a plurality of manually operable switches optionally controlling the energization of the respective electro-magnet means.

40. In a preselector mechanism: a movable elongated magnetically permeable control medium; means for advancing said medium along a predetermined path in a manner to define sections of substantially equal length therealong; a plurality of magneto-responsive operators; a corresponding plurality of electro-magnet means positioned along said path within the length of a section but spaced in advance of said magneto-responsive operators for impressing a magnetic zone on said medium for actuating the respective operators; means including a switch for controlling energization of said magnet means; means for synchronizing operation of said switch with advancement of said medium, whereby said electromagnet means is energizable only at a corresponding point in each section; and a plurality of manually operable switch means for selectively connecting the respective electromagnet means with a D. C. source to impress such zones on said medium or with a varying A. C. source to erase an existing zone.

41. In a preselector mechanism: a driven member; a movable control medium carried by said driven member; optionally operable means for creating an activating zone on said medium; an operator responsive to said zone when adjacent the operator; cooperating registering means on said driven member in said medium for adjusting the distances between said zone and said operator by a predetermined amount; driving means connectable with said driven member for continuously advancing said medium to position said zone adjacent the operator; and clutching means for selectively connecting said driving means to and disconnecting said driving means from said driven member to permit said advancement or said adjustment, respectively.

42. In a preselector mechanism: a driven member; a movable, magnetically permeable, control medium carried by said driven member; an operator responsive to a magnetic zone on said medium; means for impressing said zone on said medium, spaced from said operator; cooperating registering means on said driven member and said medium for adjusting the distances between said zone and said operator by a predetermined amount; driving means for advancing said medium to cause said zone to actuate said operator; and clutching means for selectively connecting said driving means to and disconnecting said driving means from said driven member to permit said advancement or said adjustment, respectively.

43. In a preselector mechanism: a driven member; a movable magnetically permeable, control medium carried by a driven member; an operator responsive to a magnetic zone on said medium; means for impressing said zone on said medium, spaced from said operator; cooperating registering means on said driven member and said medium for adjusting the distances between said zone and said operator by a predetermined amount; driving means connectible with said driven member for advancing said medium to cause said zone to actuate said operator; and clutching means for selectively connecting said driving means to and disconnecting said driving means from said driven member to permit said advancement or said adjustment, respectively.

RALPH A. HAMILTON.

References Cited in the file of this patent

UNITED STATES PATENTS

| Number | Name | Date |
|---|---|---|
| 699,630 | Pedersen | May 6, 1902 |
| 720,621 | Rosenbaum | Feb. 17, 1903 |
| 1,656,216 | Melby | Jan. 17, 1928 |
| 1,979,998 | Price | Nov. 6, 1934 |
| 2,298,519 | Tillman | Oct. 13, 1942 |
| 2,370,133 | Begun | Feb. 27, 1945 |
| 2,396,409 | Berzer | Mar. 12, 1946 |
| 2,401,888 | Smith | June 11, 1946 |
| 2,431,646 | Kenny et al. | Nov. 25, 1947 |
| 2,436,829 | Roth | Mar. 2, 1948 |
| 2,439,446 | Begun | Apr. 13, 1948 |